June 12, 1923.

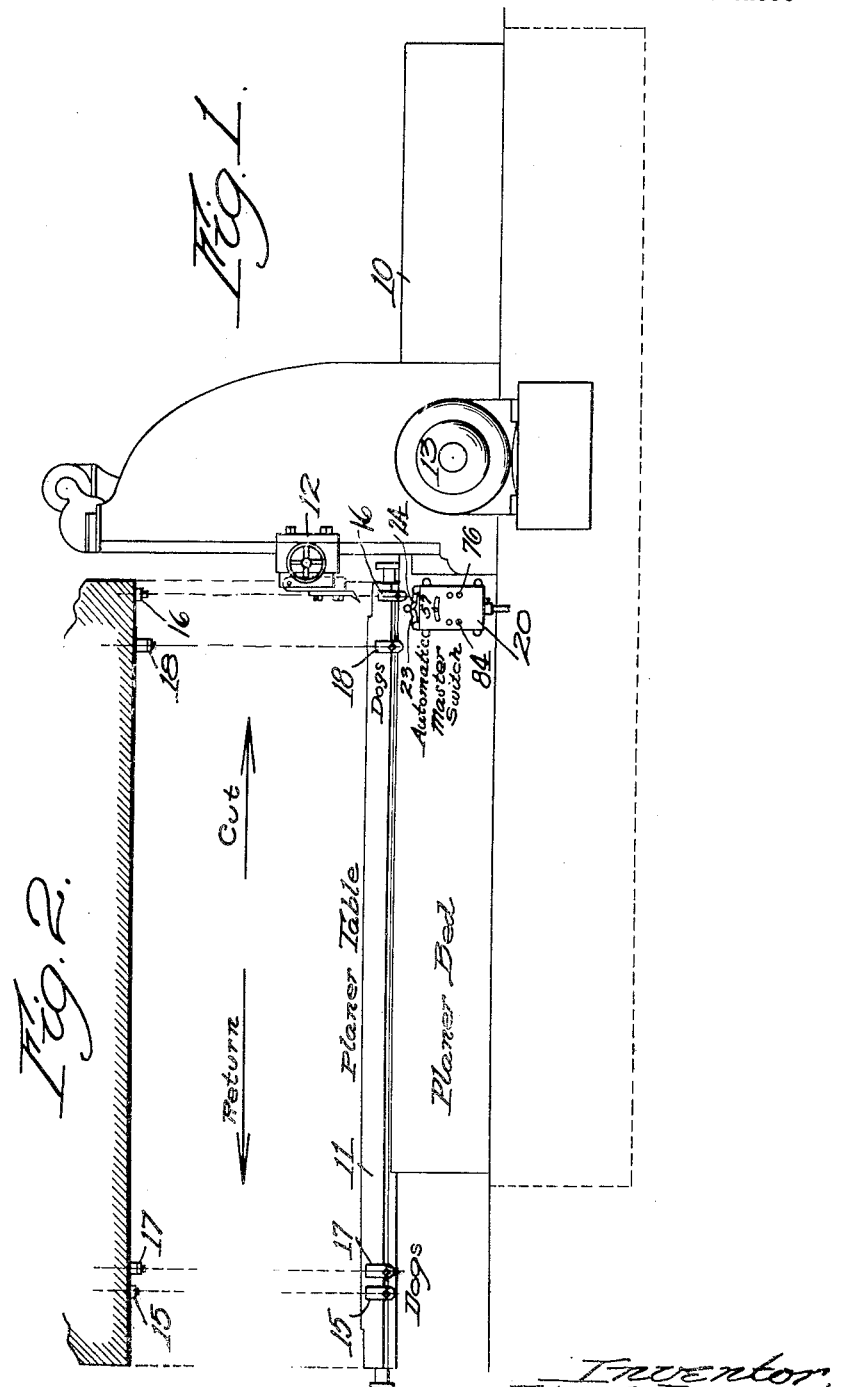

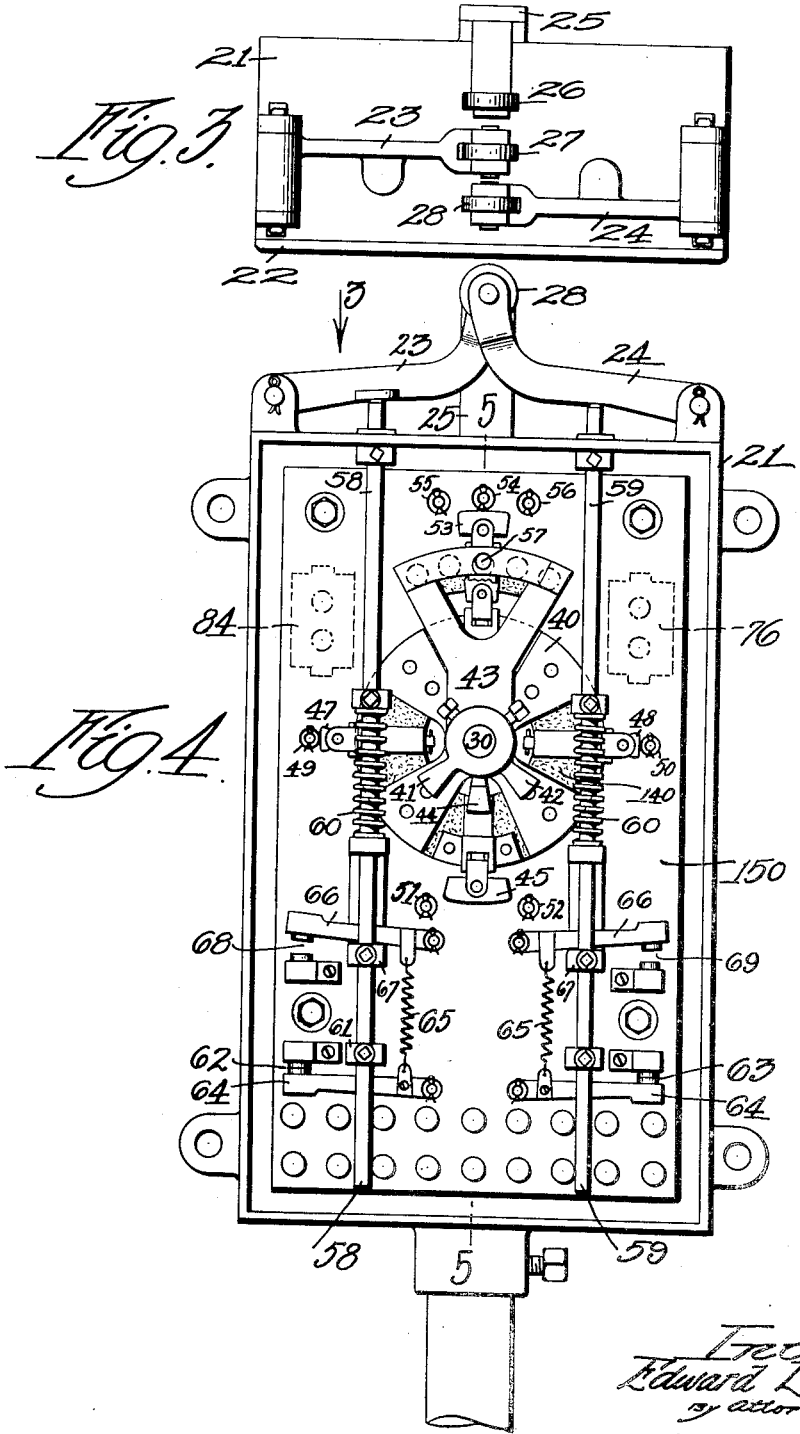

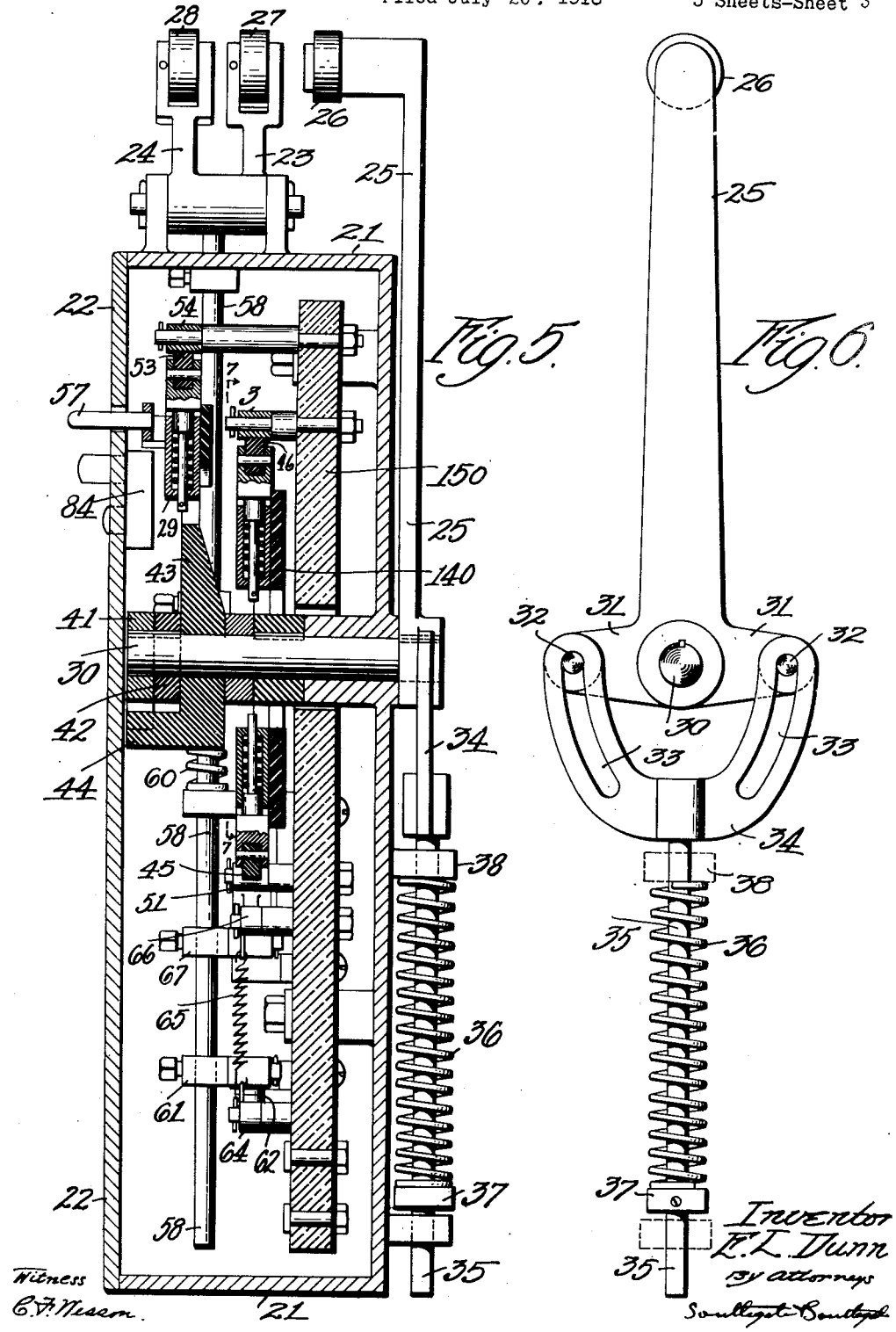

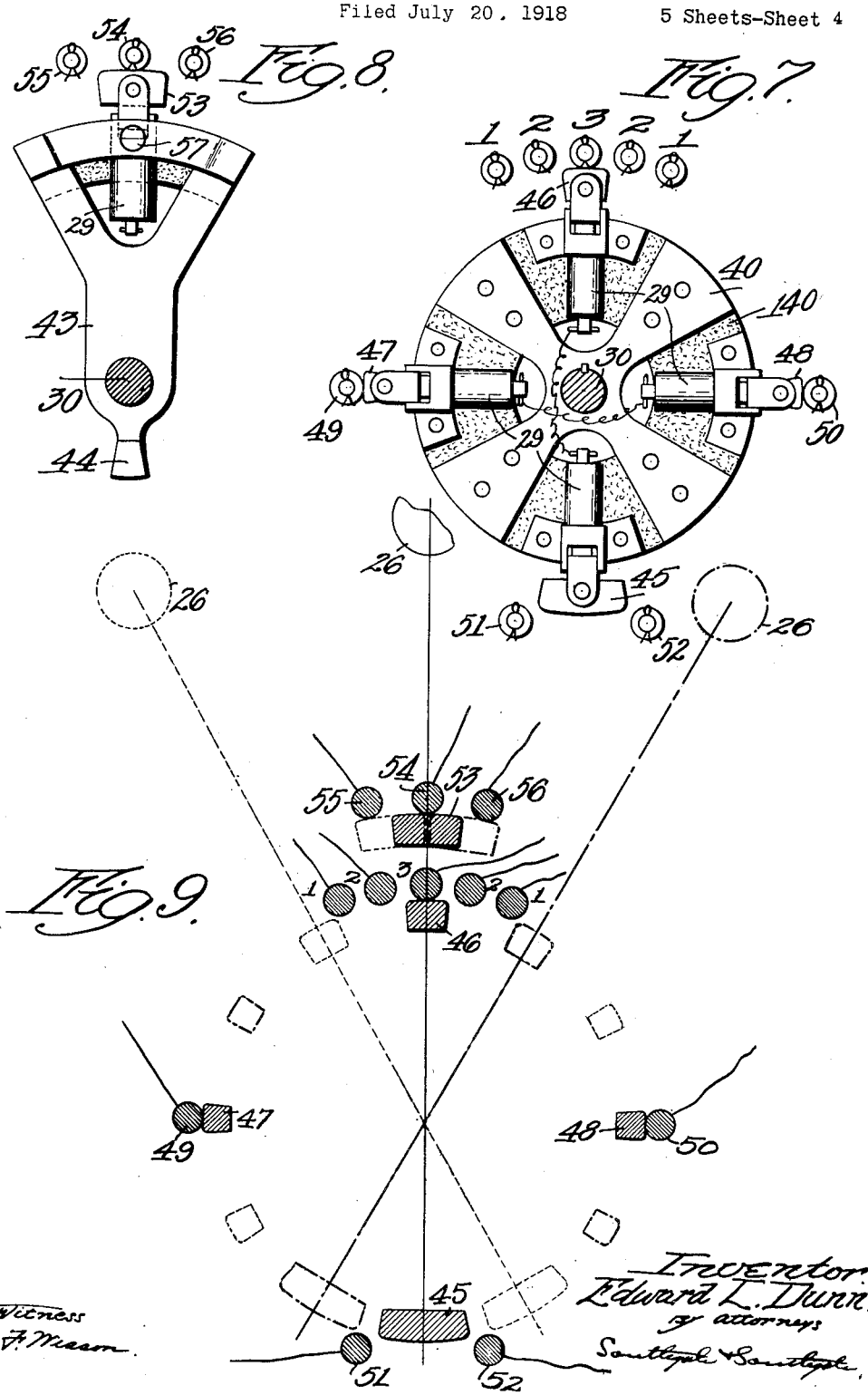

E. L. DUNN 1,458,902

CONTROLLER FOR REVERSING MACHINES

Filed July 20, 1918    5 Sheets-Sheet 5

Patented June 12, 1923.

1,458,902

UNITED STATES PATENT OFFICE.

EDWARD L. DUNN, OF WORCESTER, MASSACHUSETTS, ASSIGNOR, BY MESNE ASSIGN-
MENTS, TO MERCHANTS NATIONAL BANK, OF WORCESTER, MASSACHUSETTS, A
CORPORATION OF MASSACHUSETTS.

CONTROLLER FOR REVERSING MACHINES.

Application filed July 20, 1918. Serial No. 245,878.

*To all whom it may concern:*

Be it known that I, EDWARD L. DUNN, a citizen of the United States, residing at Worcester, in the county of Worcester and State of Massachusetts, have invented a new and useful Controller for Reversing Machines, of which the following is a specification.

This invention relates to a controlling device for governing all necessary movements of machines that reverse so that the same can be started, accelerated, retarded, stopped and reversed automatically.

The principal objects of the invention are to provide an automatic master switch for this purpose adapted to be operated automatically by means of adjustable dogs or the like carried by the reciprocating element, such as the table of a metal planer; to provide a controller for this purpose which will be positive in action and will be governed entirely by the movement of the table or the like; to provide arrangements whereby during each part of the movement of the table a step of armature resistance is cut out until the armature reaches its full strength and to provide a variable speed control operated entirely by electrical means and adjustable to any part of the stroke and to any degree of acceleration through a wide range and also capable of being thrown out of operation readily so that the speed will be constant.

In prior devices with which I am familiar a smaller tumbler switch having two circuits is attached to the machine. This is engaged by the moving table at each end of the stroke and all automatic features, such as starting, stopping and reversing have been accomplished by the motor controller in response to the tumbler switch. With my invention the switch by its movement completely governs the motor controller in all respects and the controller governs the motor accordingly.

This invention is capable of application to spinning machinery, wood working machinery, metal slotters and the like, but I have shown it herein as applied to a metal planer.

Further objects and advantages of the invention will appear hereinafter.

Reference is to be had to the accompanying drawings, in which—

Fig. 1 is a side view of an ordinary type of planer showing one way of applying this invention thereto;

Fig. 2 is a plan of the edge of the table showing the relative location of the dogs;

Fig. 3 is a plan on enlarged scale of the automatic master switch and controller;

Fig. 4 is an elevation of the same with the front cover plate removed;

Fig. 5 is a sectional view of the same along the central line 5—5 of Fig. 4;

Fig. 6 is a rear elevation of the central switch lever thereof;

Fig. 7 is a sectional view on the line 7—7 of Fig. 5 showing the wheel in front elevation;

Fig. 8 is a similar view showing the pivoted switch arm in front elevation;

Fig. 9 is a diagrammatic view of this switch, and

Fig. 10 is a diagrammatic view of the wiring system.

The invention is shown as applied to a planer having the usual bed 10 and reciprocating table 11 which moves under a head 12 carrying the stationary cutting tool that feeds across by mechanism not shown herein. The table is reciprocated by means of a motor 13 geared to the rack operating gear, not shown.

The table is provided with four dogs, 15 and 16 being reversing dogs and 17 and 18 controlling dogs for other purposes as will appear. The dogs 15 and 16 are in alignment with each other while the dogs 17 and 18 are in two different planes. They control an automatic master switch and controller 20 mounted on the planer bed midway of the table 11. The controller is mounted in a casing 21 which has a cover 22.

On the top of this casing are mounted two opposite switch levers 23 and 24, while on the back of it is pivotally mounted a main switch lever 25. On this latter lever is a roller 26 located in the path of the two dogs 15 and 16. On the levers 23 and 24 are located two rollers 27 and 28 located in the paths of the dogs 17 and 18 respectively. In their normal neutral positions the rollers 26, 27 and 28 are axially in alignment. The lever 25 is fixed to a circular shaft 30 in the controller casing and is provided with two arms 31 having pins 32 operating in slots 33 on a movable member 34 at the top of a rod 35 normally held up by a spring 36. It will be seen, therefore that the action of action of the dogs 15 or 16 on the roller 26 will be to move the lever 25 over as the table moves and at table speed, pulling up on one of the pins 32 and thus compressing the spring 36 between a collar 37 on the rod 35 and a rear stationary lug 38 with which the spring engages, and it will also be seen that this lever is self-centering on account of this construction.

Fixed on this shaft 30 is a wheel 40 and also two spaced lug set collars 41 and 42. As these are all fixed to the shaft 30 they all move with the lever 25. Loosely mounted on the shaft 30 is a switch arm 43 having a lug 44 projecting from it between the two lugs of the set collars 41 and 42.

It will be seen, therefore that when the lever 25 is moved in either direction its motion will be transmitted to the wheel 40 and the set collars 41 and 42, but that this will have no effect whatever upon the switch arm 43 at first, but it will commence to move it when the projecting lug 41 or 42, as the case may be, engages the lug 44, and will continue to move it thereafter.

This wheel 40 carries an arcuate contact 45, and diametrically opposite a shorter arcuate contact 46. At intermediate but diametrically opposite points on the wheel are two contacts 47 and 48 respectively. These latter are adapted to engage two stationary contacts 49 and 50 when the parts are in the position shown in Figs. 4 and 9, that is, the neutral position. The arcuate contact 45 is adapted to engage a pair of spaced fixed contacts 51 and 52 when moved out of neutral position sufficiently. The arcuate contact 46 is adapted to bridge two adjacent contacts of a series of five located in an arcuate series and numbered respectively, 1, 2, 3, 2, 1.

On the switch arm 43 there is also an arcuate contact 53 adapted to engage a central fixed contact 54 at all times and to connect it in either of the extreme positions with one of the two fixed contacts 55 and 56, the former connected for controlling the advance of the table and the other its reverse. It is to be observed that the four contacts 45, 46, 47 and 48 are fixed with respect to the shaft and move together while the contact 53 has a lost motion connection as has been described in connection with the lugs 41, 42 and 44.

The method of mounting these several contacts on the wheel or on the switch arm is substantially the same in each case. They are yieldingly mounted to slide in a casing 29 which is carried by an insulating plate 140 of fibre or the like. The contacts 47 and 48 are electrically connected with each other across the wheel, and the same is true of the contacts 46 and 45. The contacts 49, 50, 51, 52, 54, 55 and 56 are located in a slate 150 in the casing.

Although I have not yet described the electrical connections I will state at this point that when the table is to be started on the cutting stroke in the direction indicated by the arrow, the switch lever 25 is shifted to the left either automatically or by means of a handle 57 which extends through the front of the casing and is mounted on the switch arm 43. If the latter is used when turned far enough to cause the lugs to engage it will move the lever 25 and will also move the contact 53 far enough to bridge the contacts 54 and 55. This starts the motor in the proper direction by means of connections which will be described below. When the table has moved so far that the dog 15 engages the switch lever roller 26 it will carry the lever along with it, turning the wheel 40 and breaking the connection at 54—55. The continued movement of the switch lever 25 makes a connection between the parts 53 and 56 which reverses the motor as will be explained hereinafter. As the table moves in the return direction as indicated by the arrow the switch handle 25 being self-centering, likewise returns at table speed to its central position. This has certain effects as will appear.

After the planer table has started on its return stroke the motor field is weakened by the lug 17 engaging its switch lever roller 27 and depressing it. When the planer table nears the end of its return stroke the lug 18 engages the lever roller 28 for the opposite purpose as will be described and then continued movement of the planer table stops the motor as the table dog 16 again operates the crank lever 25, opening the running circuit at 54—56, and then starting it in the forward direction for cutting by closing the circuit at 54—55.

In order to accomplish these and certain other results above mentioned certain other mechanism is employed. The levers 23 and 24 are provided with lugs which normally rest upon the top of two reciprocable rods 58 and 59 held up by springs 60. When either one of these levers is depressed by the action of the planer dog on its roller the corresponding spring 60 is depressed and a collar as 61 on the rod operates to open a pair of contacts as 62 or 63 by depressing a lever 64 which normally closes these contacts. Springs 65 hold these levers in closing position and they also hold two levers 66 in closing position. Two collars 67 on the rods 58 and 59 are located in such position as to raise the levers 66 when the rods are raised. These levers 66 control two pairs of contacts 68 and 69 respectively.

The mains which supply current to these parts are indicated at 70 and 71. The main 70 is connected with a terminal 72 and this is connected with another terminal 73 by a contact lever 74 which is designed to be controlled by a circuit breaker magnet 75. When this circuit breaker is in circuit the terminals 72 and 73 are connected by the lever 74. This circuit breaker is thrown into circuit by closing the switch 76. The circuit then passes from the main 70 through wire 77, switch 76, wire 78 to the circuit breaker 75, and through contacts 79 which are bridged by the armature of an overload magnet 80 back to the line 71. Therefore the circuit can also pass from the main 70 to the contact 73 and the auxiliary contact binding post 81 through wire 82 to the wheel contact 49 on one side of the wheel 40. Connection is made then through wire 83 and transfer switch 84 to the reversing switch contact 54. Here the circuit is broken if the parts are in neutral position shown in full lines in Fig. 9, but on shifting the handle 57 to the left the contact 53 will bridge the contacts 54 and 55. This position of the parts is indicated by dotted lines in Fig. 9. This completes the circuit in the proper direction through the contacts 53 and 55 to a pair of cut magnets 85, and from them to the line 71 through a wire 86. From this it will be seen that the reverse switch or cut magnets 85 are being fed direct from the switch controller through the contact 53 and 55. These magnets magnetically operate levers 87 bridging contacts 88 and 89. This causes the motor to start in the proper direction, but the motor circuits will be described separately to avoid confusion.

The table now starts on the cutting stroke as indicated by the arrow and the main switch lever 25 remains in neutral position and the switch arm 43 remains in its left hand position. In due time the dog 15 engages the roller 26 on the switch lever 25 carrying it along with it as has been stated. This turns the wheel 40 and carries with it the switch arm 43 back to neutral position with the result that the circuit between the contacts 54 and 55 is broken, deenergizing the reverse switch magnets 85 and opening the motor circuit at 88—89. This is shown in full lines in Fig. 9. The continued movement of the crank handle 25 connects the control 54 with the contact 56 as shown by dot and dash lines in Fig. 9, and a similar pair of reverse switch magnets 95, closing the motor circuits in the opposite direction by bridging the contacts 98 and 99 by means of levers 97.

As the table moves in the reverse direction, the crank handle as has been stated, centers itself and returns at table speed to central position. By a movement hereinafter described the motor rheostat magnets are caused to act to cut out the armature resistance step by step. This is accomplished by the return motion of the wheel 40 and the contact 46 engaging the contacts 1, 2, 3, so as to successively energize a plurality of motor accelerating auxiliary rheostat magnets 90, 91 and 92 in parallel. The time limit is regulated by the movement of the table at this time.

The reverse switch magnets 95 and the auxiliary contacts at the reverse switch 93 and 94 are connected to the lines 70 and 71. One of each pair of contacts 93 and 94 is attached to the reverse switch levers 97 and insulated therefrom. The other contacts of these pairs are mounted on the slate. Flexible wires 105 and 96 are connected to these four contacts. This circuit is as follows:— Starting at the circuit breaking contact 81 the circuit may be traced through the contact 94, wire 96 to the wheel contact 51. Then through the arcuate contact 45 on the wheel to the contact 46 and to the contacts 1, 2, 3 in accordance with the position of the wheel. The circuit from the contact 1 passes to the magnet 90 and then directly to the line 71. The other two magnets 91 and 92 are likewise energized later in the same manner from the contacts 2 and 3 respectively.

It will be noticed that the last auxiliary magnet 92 to the right closes its switch 100 and also that the feed from 51 to 46 is broken by the movement of the wheel and a new feed established through the contacts 49 and 50. This circuit is from the circuit breaker contact 81 through the line 82 through the wheel contacts 49 and 50 to the switch 100 and through the magnet 92 to the line 71. It will thus be noted that the rest of the time the rheostat auxiliary magnet 92 receives its maintaining circuit through the wheel contacts 47 and 48 and its own switch 100.

It will be observed that the planer table is now well started on its return stroke with all armatures resistance out of the circuit as will be explained below, and for further acceleration the motor field is weakened by the lug 17 engaging its switch lever roller 27. This closes the controller switch 68 and opens the controller switch 62 with the result that the return magnet 101 is energized and by its movement opens a break circuit between the contacts 102 and 103 to the field. This is caused by moving an armature 103ª and it causes the motor circuit to take a path through suitable resistance as will be described below. From what has been said, however, it will be noted that the reverse switch magnets 95, armature magnet 92 and field magnet 101 are all energized, and that the motor is running at full speed with a weak field.

The circuit through the magnet 101 is as follows:—from circuit breaker contact 81 through auxiliary reverse switch contacts 94, wire 96 through controller switch 68 and return magnet 101 through wire 104 to the controller switch 63 through wire 105 to auxiliary contact 93 and from there to the line 71 by the wire 86.

As the controller switch 68 is momentarily closed a maintaining circuit for the magnet 101 is established as follows: from the circuit contact breaker 81 through wire 82 to magnet contacts 106 and 107 now bridged by the armature 103ª through the magnet 101 and through wire 104 to switch 63, wire 105, contacts 93, wire 86 to the line 71. From this it will be seen that the field magnet 101 remains energized through the controller switch 63 and if this switch is opened the magnet will be deenergized and the field will be strengthened. This condition takes place as the planer table nears the end of its return stroke and the lug 18 is about to engage the lever roller 28, thus opening the switch 63 and deenergizing magnet 101. The continued movement of the planer table after this will stop the motor as the table dog 16 operates the switch lever 25 opening the running circuit at 54—56 and starting the same in the reverse direction by closing the contacts 54 and 55. The same will also be accelerated exactly as above described except that the field weakening is accomplished by the cut magnet 111 instead of the return magnet 101.

A point to be noted is that the feeding of the controller switch contact 45 comes from two different sources. When the cut reverse switch magnets 85 are energized the feed comes from the cut switch auxiliary contact 113, on the arms 87 to the controller switch contact 52 and vice versa, when the opposite reverse switch returning magnets 95 are energized the auxiliary switch 94 feeds the controller switch contact 51. The contacts 112 and 113 are mounted, and operate, like the contacts 93 and 94, closing with the levers 87.

In addition to the above I have provided a pendant push button switch having two buttons 116 and 117 by means of which the motor can be operated without passing through the arcuate controller contacts 45 and 53. By throwing the transfer switch the feed passes through the wire 82 to contact 49 and through wire 83 at the transfer switch 84 and from a switch contact 114 to push button contacts. When the contact is made either at 116 or 117 the feed is started to the reverse switch magnet 85 or 95, thus causing the motor to run in the direction desired as long as the push button circuit remains closed. This push button is for temporary use only.

Having described the controller circuits I will now describe briefly the motor circuits. These are all shown in Fig. 10. With the circuit breaker 75 open and the motor at rest a dynamic circuit is established for the purpose of permitting a quick emergency stop. The circuit breaker contacts 120 are bridged while the circuit breaker is opened. A circuit can be traced from one of the contacts 120 directly to one of the armature binding posts through a resistance 121 to the circuit breaker contact 120 on the other side through the motor.

It will be seen, therefore, that while the circuit breaker is open the armature is in the circuit with a resistance. When the circuit breaker is closed magnetically by means of the switch 76 it is to be noted that there is a no-voltage release fixture. In other words, if the line voltage fails, the circuit breaker being closed magnetically, it will obviously release automatically if there is no voltage. Also it is to be noted that all the current flowing from the circuit breaker contact 73 passes through the over-load magnet 80. Consequently if the current reaches a predetermined point this magnet will lift its armature from the contacts 79 open-circuiting the circuit breaker 75 and thus opening the line. It is clear therefore that the motor controller is provided with no voltage and over-load protecting features.

Assuming now that the circuit breaker 75 is closed the circuit is established between 72 and 73 by means of a lever contact 74 and flexible wire. Feed is also established to contact 81 from the line 70.

It is to be noted at this point that the shunt field 123 of the motor is directly across the line circuit which is established as follows:—from binding post 81 through the wire 82 and the magnet switch contacts 102 and 103 through armatures 103ª and the corresponding ones for the cut field magnet 111 through the shunt field to the line 71. When resistance is inserted in the field the speed will be increased accordingly. Therefore if the magnet 101 lifts its armature as previously described the contact 102—103 will be opened and the circuit must pass through resistance 124. It is to be noted that a separate adjustable resistance 124 is provided for each direction of motor travel, this being indicated by the movable arms 125.

Assuming now that the return switch magnets 95 are energized the reverse switch contacts 98—99 will be connected and current will flow through the motor, causing the same to run. This circuit is from line 70 to the circuit breaker contact 73 through the overload coil to the binding post 126 through the series field 127 and the armature resistance 128 to the binding post 129. From there to the reverse switch contact 99 through switch lever 97 to the terminal 98 and the armature binding post through the armature 130 to the right hand reverse switch terminal 98 to the right hand contact terminal 99 and to the other side of the line 71.

When the rheostat magnets 90—91—92 are energized consecutively the armature resistance is cut out of the circuit consecutively by means of three pairs of contacts 131 and 132. This accelerates the motor and the point of acceleration is controlled by the setting of the collars 41 and 42. When the last two of these are bridged the series field 127 is cut out of the circuit and the motor will now be run as a straight shunt motor. Of course when the motor is operated in the reverse direction the circuits are identical except that the opposite reverse switch 85 closes and the opposite field switch 111 is closed.

I have described the motor circuits in full simply to show that the controller is operative to produce the desired results as these motor circuits do not constitute a feature of this invention in general.

Although I have illustrated and described only a single construction and system of circuits particularly motor circuits and shown the invention as applied only to a planer I am aware of the fact that modifications can be made therein especially in the wiring and that it can be applied to other reversing machines without departing from the scope of the invention as expressed in the claims.

Therefore I do not wish to be limited to these details, but what I do claim is:—

1. The combination with a machine, of an electric motor connected with the machine for operating it, a motor controller operated by the machine, a series of accelerating magnets, means operated by the controller for bringing said magnets into action one after the other, a switch connected with the last one to close as the stroke proceeds, and connections to said switch for feeding it and its motor accelerating magnet through the controller.

2. The combination with a reciprocating machine, of an electric motor connected with the machine for operating it, a motor controller, a series of motor accelerating magnets, means for bringing said magnets into action one after the other, a switch connected with the last one to close as the stroke proceeds, and connections to said switch for feeding it through the controller, said controller being connected to move as the machine reciprocates so as to interrupt the circuit to the last accelerating magnet before reversal or stoppage of the motor.

3. The combination with a machine, of an electric motor connected with the machine for operating it, a motor controller, a switch lever positively connected with said controller and operated by the machine, means operated by the controller for starting the motor, accelerating it and reversing it, the accelerating means comprising a series of accelerating magnets, means for bringing said magnets into action one after the other, and connections for feeding through the controller the last motor accelerating magnet to close as the stroke proceeds.

4. The combination with a reciprocating machine, of an electric motor connected with the machine for operating it, a motor controller comprising two cross connectors, each with a contact at each end, operated by the machine, and means operated by the controller for accelerating the motor comprising a series of accelerating magnets, means for bringing said magnets into action one after the other, a switch connected with the last one to close as the stroke proceeds, and connections to said switch for feeding it through the controller, said controller being connected to move as the machine reciprocates so as to interrupt the circuit to the last accelerating magnet first through one of said connectors and afterward through the other and through said switch.

5. In an electric motor controlling device, the combination of a shaft, a switch lever fixed on said shaft, means for yieldingly holding said lever in central position but permitting it to be swung in either direction therefrom, contacts movable with said lever, stationary contacts located in position for engagement by the movable contacts, a switch arm loosely mounted on said shaft, means on said shaft for moving the switch arm after the shaft has started to move in either direction, a pair of contacts spaced apart and having connections for controlling the direction of motion of the motor, an intermediate contact having connections for supplying them with current, and a contact on said switch arm for connecting the intermediate contact with either one of the others after the switch arm has moved through a definite arc.

6. The combination of a motor controller with means operated by the controller for accelerating a motor, comprising a series of accelerating magnets, means for bringing said magnets into action one after the other, an independent switch connected with and feeding the last one to close as the acceleration proceeds, and connections to said switch for cutting it out through the controller before reversing.

7. In an electric motor controlling device, the combination of a shaft, a switch lever fixed on said shaft and projecting radially from it, a spring for yieldingly holding said lever in central position but permitting it to be swung in either direction therefrom to a limited degree, a wheel fixed to said shaft, contacts carried by said wheel and connected across it, stationary contacts located around said wheel for engagement by the contacts on the wheel, means for conducting a current from one of a pair of mains to one of said stationary contacts on one side of the wheel, means for conducting the current to one of the other stationary contacts, a switch arm loosely mounted on said shaft, means on said shaft for moving the switch arm after the shaft has started to move in either direction, a pair of contacts spaced apart, and having connections for controlling the direction of motion of the motor, an intermediate contact having connections for supplying them with current, and a contact fixed on said switch arm for connecting the intermediate contact with either one of the others after the switch arm has moved through a definite arc.

8. In a combined master switch and controller, the combination of a switch lever, a wheel fixed with respect to said lever and having contacts yieldingly mounted thereon arranged in two pairs, the two contacts of each pair being connected with each other across the wheel, a plurality of stationary contacts arranged around the wheel adapted to be engaged by the wheel contacts according to the position of the wheel, means for conducting the current from one of a pair of mains to one of said stationary contacts on one side of the wheel, means for conducting the current to one of the other stationary contacts from the same side of the line, said cross connections constituting means for connecting a circuit in certain positions of the wheel from either of the movable contacts corresponding with said stationary contacts, the stationary contacts corresponding with one pair of movable contacts being single and being adapted to be connected with their movable contacts simultaneously, the stationary contacts for one of the other contacts being two in number and located far enough apart to prevent both being connected at the same time, the last named movable contact being arcuate in shape and adapted to bridge two of the stationary contacts as it moves and to connect them in succession with one of the opposite contacts.

9. In a combined master switch and controller, the combination of a shaft, a switch lever fixed on said shaft, a wheel on said shaft having contacts mounted thereon arranged in two pairs, the two contacts of each pair being connected with each other across the wheel, a plurality of stationary contacts arranged around the wheel adapted to be engaged by the wheel contacts according to the position of the wheel, means for conducting a current from one of a pair of mains to one of said stationary contacts on one side of the wheel, means for conducting the current to one of the other stationary contacts from the same side of the line, and means for completing the circuit, in certain positions of the wheel, from either of the movable contacts corresponding with said stationary contacts.

10. In an electric controlling device, the combination of a shaft, a switch lever fixed on said shaft, and a controller having means for cutting out armature resistance step by step as the lever moves, said controller embodying a wheel fixed to said shaft, contacts carried by said wheel, stationary contacts located around said wheel for engagement by the contacts on the wheel, means operated by the wheel after it starts to turn in either direction with the switch lever for closing a circuit through certain of said stationary contacts, a switch arm loosely mounted on said shaft, means on said shaft for moving the switch arm after the shaft has started to move in either direction, a pair of contacts connected with a source of electric power and spaced apart, an intermediate contact connected for supplying them with current, and a contact fixed on said switch arm for connecting the intermediate contact with either one of the others after the switch arm has moved through a definite arc.

11. In an electric controlling device, the combination of a shaft, a switch lever fixed on said shaft, a wheel fixed to said shaft, contacts carried by said wheel, stationary contacts located around said wheel for engagement by the contacts on the wheel, means operated by the wheel after it starts to turn in either direction with the switch lever for closing a circuit to certain of said stationary contacts, a switch arm loosely mounted on said shaft, means on said shaft for moving the switch arm after the shaft has started to move, a pair of contacts connected with the line and spaced apart, an intermediate contact connected for supplying them with current, and a contact fixed on said switch arm for connecting the intermediate contact with either one of the others after the switch arm has moved through a definite arc, a motor, and means connected with said pair of contacts for feeding the motor and determining its direction of rotation.

12. In an electric motor controlling device, the combination of a shaft, a switch lever fixed on said shaft, a wheel fixed to said shaft, contacts carried by said wheel, stationary contacts located around said wheel for engagement by the contacts on the wheel, means operated by the wheel after it starts to turn in either direction with the switch lever for connecting certain of said stationary contacts with a source of electric power, conductors for transmitting current from the moving contacts, means for varying the field of the motor to accelerate or retard it, and a pair of levers having their ends in alignment with said main switch lever and provided with means for controlling the field varying means.

13. The combination of a motor controller comprising two cross connectors each with a contact at each end, means operated by the controller for accelerating the motor, a series of accelerating magnets, means for bringing said magnets into action one after the other, a switch connected independently of the others with the last one to close as the stroke proceeds, and connections to said switch for feeding it through the controller, said controller being connected to move with the switch lever so as to feed the last accelerating magnet first through one of said connections and afterwards through the other and through said switch.

14. In an electric motor controlling device, the combination of a switch lever, contacts movable with the lever, stationary contacts located in position for engagement by the first named contacts, means operated with the switch lever for closing a circuit to certain of said stationary contacts, conductors for transmitting current from the moving contacts, means electrically connected with said conductors for varying the field of the motor to accelerate or retard it, and a pair of levers having their ends in alignment with said main switch lever and provided with means for controlling the field varying means.

In testimony whereof I have hereunto affixed my signature,

EDWARD L. DUNN.